United States Patent
Haight et al.

(10) Patent No.: US 9,054,584 B2
(45) Date of Patent: Jun. 9, 2015

(54) LOAD DETECTION FOR A LOW POWER MODE IN AN AC-DC ADAPTER

(75) Inventors: Carlton Michael Haight, Dallas, TX (US); David Wardell Ortte, Jr., Frisco, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 587 days.

(21) Appl. No.: 13/368,962

(22) Filed: Feb. 8, 2012

(65) Prior Publication Data

US 2012/0206947 A1    Aug. 16, 2012

Related U.S. Application Data

(60) Provisional application No. 61/443,589, filed on Feb. 16, 2011.

(51) Int. Cl.
*H02M 7/217* (2006.01)
*H02M 1/00* (2006.01)

(52) U.S. Cl.
CPC ...... *H02M 7/217* (2013.01); *H02M 2001/0035* (2013.01); *Y02B 70/16* (2013.01)

(58) Field of Classification Search
CPC . H02M 7/04; H02M 2001/0035; H02M 1/36; H02M 3/33507; Y02B 70/16
USPC ............ 363/41, 49, 21.01, 13, 74, 78, 84, 89, 363/127, 146
See application file for complete search history.

(56) References Cited

U.S. PATENT DOCUMENTS

| | | | |
|---|---|---|---|
| 6,792,042 B1 * | 9/2004 | Bae ............................... | 375/238 |
| 7,911,817 B2 | 3/2011 | Kasprzak et al. | |
| 8,204,531 B2 * | 6/2012 | Jin et al. ........................ | 455/522 |
| 8,300,442 B2 * | 10/2012 | Wang et al. ................... | 363/146 |
| 2005/0046399 A1 * | 3/2005 | Gan et al. ...................... | 323/222 |
| 2010/0067268 A1 * | 3/2010 | Kasprzak et al. ............... | 363/74 |
| 2010/0254162 A1 * | 10/2010 | Lanni .............................. | 363/15 |
| 2011/0199798 A1 * | 8/2011 | Matthews ....................... | 363/79 |

OTHER PUBLICATIONS

TEA1703T GreenChip SMPS standby control IC Rev. 2.3. Datasheet [online]. TXP Corporation, Apr. 28, 2011. Retrieved from the internet: <URL: http://www.nxp.com/documents/data_sheet/TEA1703T.pdf>.

* cited by examiner

*Primary Examiner* — Jessica Han
*Assistant Examiner* — Gustavo Rosario Benitez
(74) *Attorney, Agent, or Firm* — North Weber & Baugh LLP

(57) ABSTRACT

Various embodiments of the present invention relate to AC-DC adapters, and more particularly, to systems, devices and methods of employing a load detector to detect a load condition of the AC-DC adapters based on transient variation of a DC output voltage; and therefore, enable the AC-DC adapters to switch from a low power mode to a normal power mode. At the low power mode, a DC output voltage is generated at a target voltage by the AC-DC adapter, and subsequently drops at a decay rate dependent on load condition. The load detector is electrically coupled to monitor the output voltage and measure the decay time between two threshold voltages. An enable instruction is provided to configure the AC-DC adapter to the normal power mode as soon as the decay time is lower than the threshold decay time or the variation of consecutive decay times reaches a certain threshold.

17 Claims, 6 Drawing Sheets

LOAD DETECTION FOR A LOW POWER MODE IN AN AC-DC ADAPTER

CROSS REFERENCE TO RELATED APPLICATION

The application claims the benefit under 35 U.S.C. §119(e) of Provisional Application Ser. No. 61/443,589, entitled "Load Detection for a Low Power Mode in an AC-DC adapter", filed on Feb. 16, 2011, the subject matter of which is incorporated herein by reference.

BACKGROUND

A. Technical Field

The present invention relates to AC-DC adapters, and more particularly, to systems, devices and methods of employing a load detector to detect a load condition of the AC-DC adapters based on transient variation of a DC output voltage, and therefore, enable the AC-DC adapters to switch from a low power mode to a normal power mode.

B. Background of the Invention

AC-DC adapters are power supplies commonly employed to convert an alternating current (AC) to a direct current (DC) for powering various electronic devices. A typical AC-DC adapter is based on a linear power supply or a switched-mode power supply. Originally most AC-DC adapters were linear power supplies comprising a transformer, a rectifier and a filter. The transformer directly down-converts the incoming AC signal to a lower voltage AC signal at the same frequency prior to rectification and filtering for generating a satisfactory DC voltage level which may have a negligible ripple variation. Due to the relatively low frequency of 50 Hz or 60 Hz, the transformer was relatively large. The bulky transformer not only introduces losses but also fundamentally limits the adapter from being integrated into wall outlets. Moreover, a resistive divider configuration is adopted to maintain a stable DC output voltage from the linear power supplies. Significant power loss as heat causes low energy efficiency even when the linear power supply does not drive a load.

To address the issues of physical size and power efficiency, switched-mode power supplies have recently been employed. In a typical switched-mode power supply, the frequency of the incoming AC signal is first up-converted to a higher frequency, and as a result, both the size and the power loss of the transformer are reduced. Moreover, pulse width modulation rather than a resistive divider configuration is employed to regulate the output voltage in a switched-mode power supply. The overall energy efficiency of a switched-mode power supply doubles that of a linear power supply.

The upcoming Energy Star 2013 will impose more stringent challenges on the energy efficiency of power supplies. Energy efficiency has already been enhanced from 30-40% to the range of 65% to 80% by using switched-mode power supplies rather than linear power supplies. However, to further enhance energy efficiency, a sleep mode or a low power mode is mandated when any power supply is first connected to wall sockets or when no DC load is applied.

When the switched-mode power supply is applied to drive a DC load such as a notebook computer, a data pin is employed to identify the presence of load so that the AC-DC adapter may switch between power modes based on the load condition. FIG. 1A illustrates an exemplary block diagram 100 for an AC-DC adapter 110 coupled to a DC-powered device (a DC load) 160. The AC-DC adapter 110 consists of a switched-mode power supply (SMPS) 102 and a power supply identification circuit 104. The cable 112 connecting the AC-DC adapter 110 to a DC load 160 (e.g., the notebook computer) is a co-axial, plug-in-type 3-pin connector including a positive terminal 118 (i.e., VOUT wire), a negative terminal 120 (i.e., ground wire), and a center data pin 122 (i.e., Load Presence/ID). The center data pin 122 is used to communicate power supply identification (PSID) information to the DC load 160. An auto-sensing circuitry in the PSID circuit 104 is configured to detect non-existence of the DC load 160 by monitoring the absence of PSID signals communicated from the DC load 160 to the PSID circuit 104. The Load Presence/ID signal is generated to indicate load condition and control a power mode control circuit 106 that further enables a proper power mode in the switched-mode power supply 102.

The aforementioned AC-DC adapter starts up at the low power mode every time it is plugged into a wall socket. The PSID circuit is used to detect the DC load and control the SMPS to switch from the low power mode to a normal power mode. This approach requires a data cable to connect the AC-DC adapter 110 and the DC load 160 in addition to two DC power terminals. When the data pin 122 is inadvertently damaged, the AC-DC adapter may never initiate the normal power mode to drive the DC load properly. A serial resistor may be placed in the VOUT path between the AC-DC adapter 110 and the DC load 160 to monitor the load condition. A low impedance resistor has to be used to minimize its power consumption, and as a result, a highly sensitive readout circuit has to be applied to detect any variation of the voltage drop on the serial resistor. An alternative solution is needed to effectively detect the load condition and start the normal power mode properly.

SUMMARY OF THE INVENTION

The present invention relates to AC-DC adapters, and more particularly, to systems, devices and methods of employing a load detector to detect a load condition of the AC-DC adapters based on transient variation of an output voltage; and therefore, enable the AC-DC adapters to switch from a low power mode to a normal power mode. In particular, the load detector is coupled to the adapter output directly and detects a DC load that is formerly communicated to and detected through a dedicated data channel by a PSID circuit.

At the low power mode, a DC output voltage is generated at a target voltage by the AC-DC adapter, and subsequently drops at a decay rate dependent on whether a DC load is applied. The DC load increases the decay process by several orders. A load detector is electrically coupled to monitor the output voltage and measure the decay time between two predetermined threshold voltages. An enable instruction is provided to configure the AC-DC adapter to the normal power mode as soon as the decay time is lower than a threshold decay time or the variation of consecutive decay times reaches a certain threshold.

The AC-DC adapter comprises a switched-mode power supply (SMPS) core and a power control loop. The power control comprises the load detector, a low power mode control circuit and an opto-coupler. The load detector is used to sense the DC load, and the low power mode control circuit generates a corresponding signal to control the opto-coupler to enable the SMPS core to start the normal power mode. The power control loop may further comprise a PSID circuit.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Embodiments of the present invention provide systems, devices and methods of employing a load detector to detect a load condition of an AC-DC adapter based on transient variation of an output DC voltage; and therefore, enable the AC-DC adapter to switch from a low power mode to a normal power mode. In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of structures. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Figure 1A:
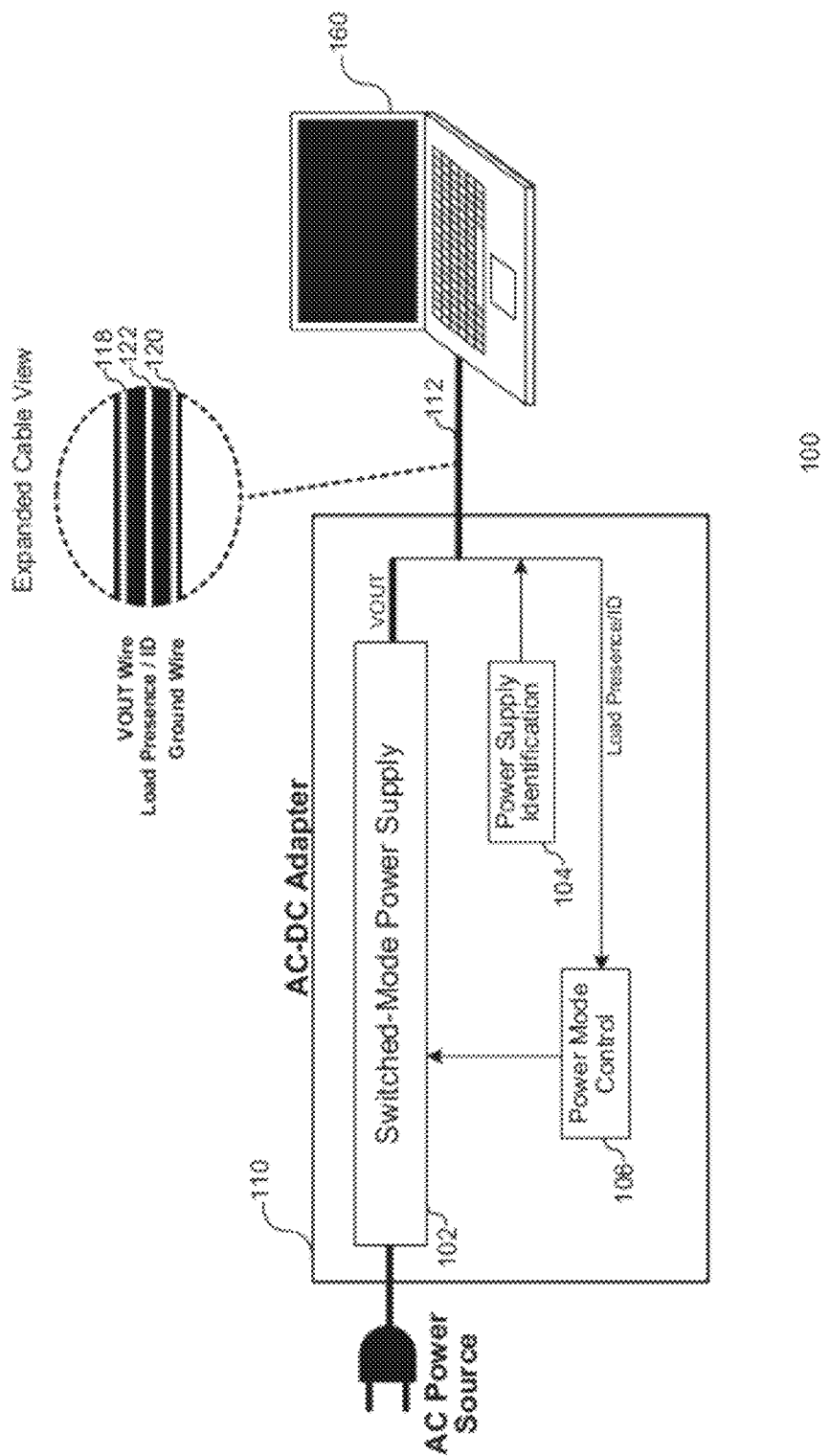
FIG. 1A illustrates an exemplary block diagram for an AC-DC adapter coupled to a DC-powered device.
Figure 1B:
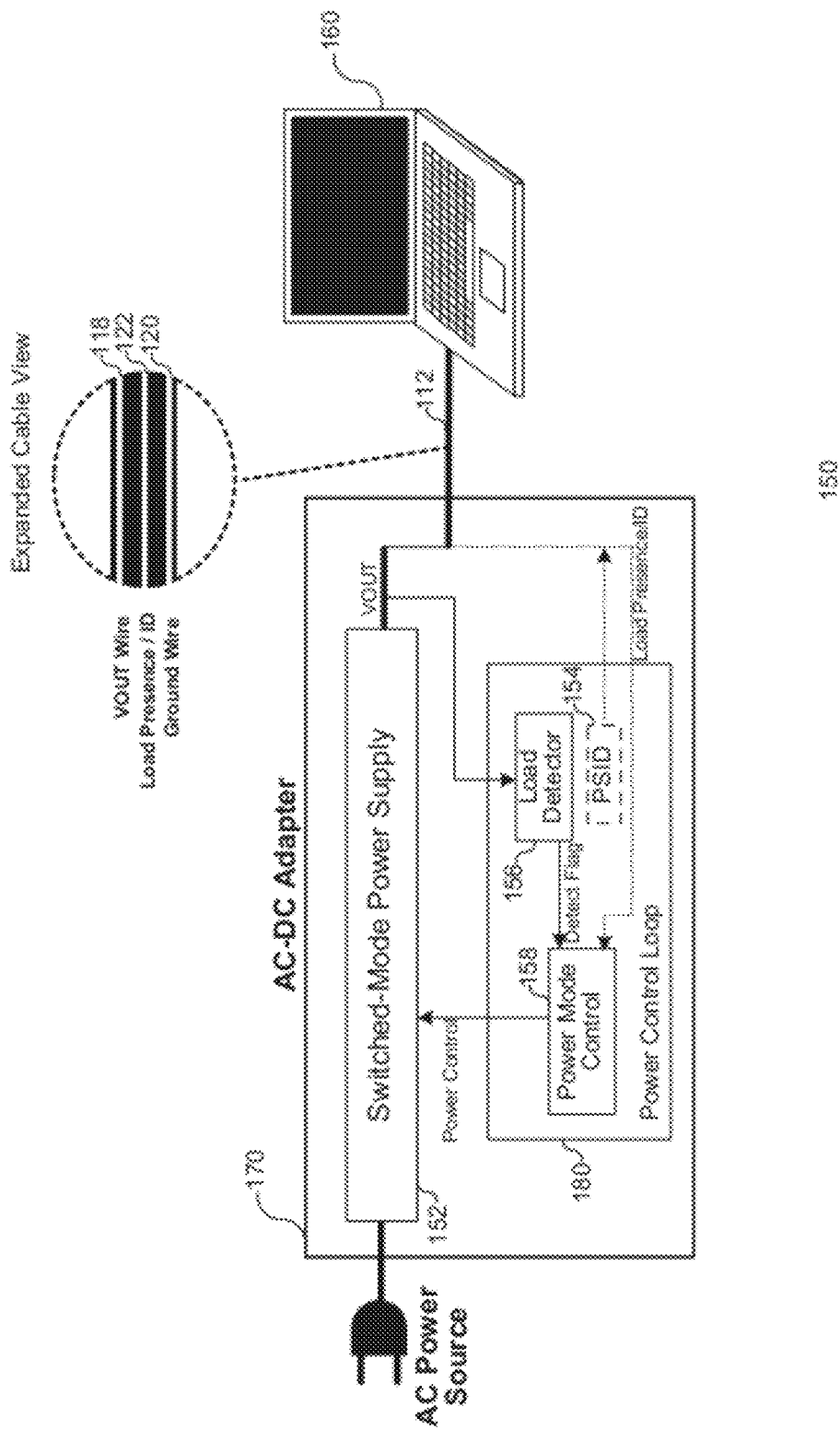
FIG. 1B illustrates another exemplary block diagram for an AC-DC adapter coupled to a DC-powered device according to various embodiments of the invention.

FIG. 1B illustrates an exemplary block diagram 150 for an AC-DC adapter 170 coupled to a DC-powered device 160 (i.e., a DC load) for the present invention. The AC-DC adapter 170 comprises a switched-mode power supply 152 and a power control loop 180. The power control loop 180 comprises a load detector 156 and a power mode control circuit 158. The load detector 156 is coupled to an output of the switched-mode power supply, and generates a signal Detect Flag according to load condition. The signal Detect Flag is subsequently used by the power mode control 158 to generate a control signal Power Control to implement pulse width modulation in the switched-mode power supply 152.

A power supply identification (PSID) circuit 154 may be included in the power control loop 180, and however, it may need a dedicated data channel/pin. A 3-pin connector 112 has to be used to provide the data pin 122 in addition to a pair of voltage terminals 118 and 120. Therefore, when the PSID circuit 154 or the data pin 112 is inadvertently broken, the load detector 156 may still effectively detect the DC load 160 by measuring the output voltage VOUT directly; and hence, the AC-DC adapter 170 may be properly configured to a normal power mode, providing a regulated DC voltage sufficient to drive the DC load 160.

Figure 2:
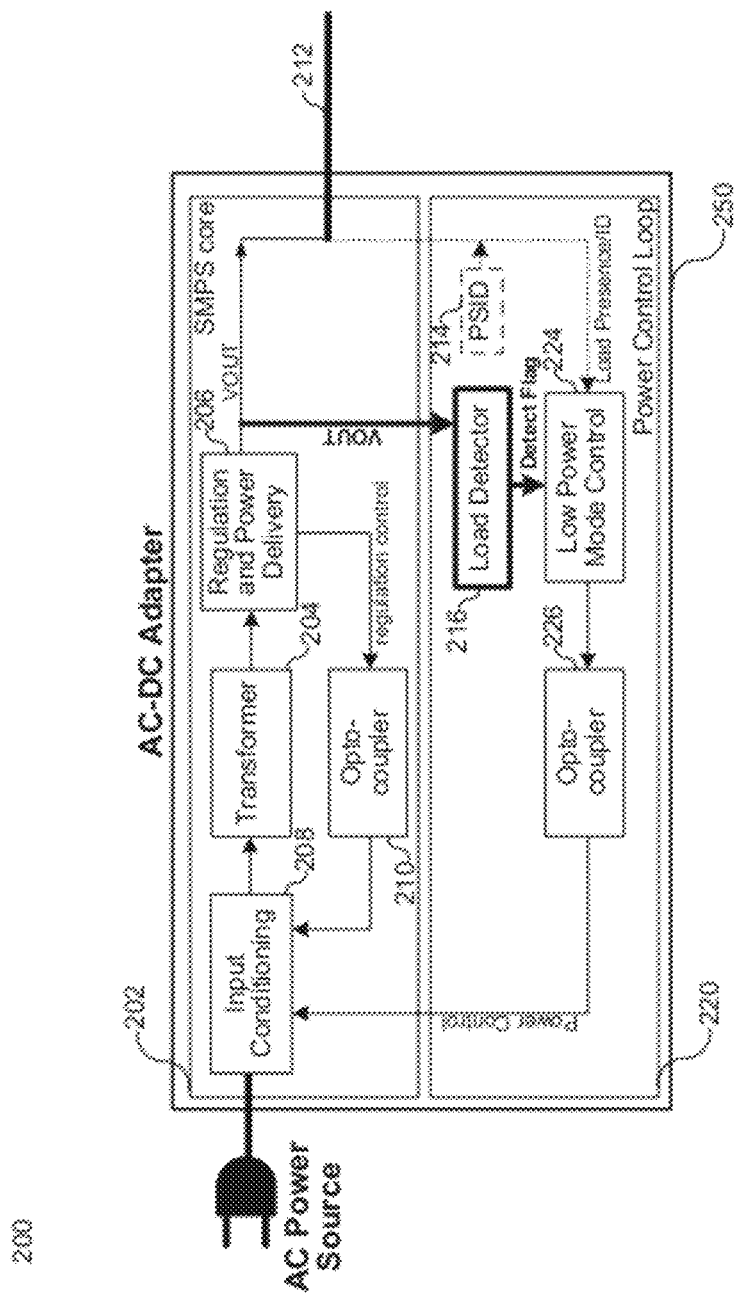
FIG. 2 illustrates an exemplary block diagram for an AC-DC adapter based on a load detector according to various embodiments of the invention.

FIG. 2 illustrates a detailed block diagram 200 for an AC-DC adapter based on a load detector 216. The AC-DC adapter 200 consists of a switched-mode power supply (SMPS) core 202 and a power control loop 220. The SMPS core 202 is coupled to receive standard AC power which is typically an 110V or 220V AC signal at a frequency of 50 Hz or 60 Hz from wall sockets. The output voltage VOUT is generated to drive a DC load using a 2-pin connector or a 3-pin connector 212.

The SMPS core 202 further comprises an input conditioning circuit 208, a transformer 204, a regulation and power delivery circuit 206, and an opto-coupler 210. The input conditioning circuit 208 is coupled to receive the incoming AC signal. In the input conditioning circuit 208, the AC signal is rectified and filtered to generate an intermediate DC signal which is used to control an internal oscillator to generate a first AC signal. The first AC signal has a typical frequency between 50 kHz and 1 MHz, higher than the maximum audible frequency (i.e., 20 kHz). The first AC signal is then used to drive the primary winding of the transformer 204 and converted to a second AC signal having a satisfactory magnitude at the secondary winding of the transformer 204. The second AC signal is subsequently rectified and filtered to generate the DC output voltage VOUT by the regulation and power delivery circuit 206.

A switched feedback loop is connected by the opto-coupler 210 to tightly regulate the output voltage VOUT. The output voltage VOUT is compared to a reference voltage in the regulation and power delivery circuit 206, and a regulation control signal is generated to control the opto-coupler 210. The opto-coupler 210 transfers the regulation control signal via optical wave, and it effectively isolates the output voltage VOUT from noises generated by the input conditioning circuit 208. Upon receiving a high regulation control signal, the light-emitting diode (LED) of the opto-coupler 210 is turned on and generates a current in a photosensor in the opto-coupler 210. A switch control circuit in the input conditioning circuit 208 is coupled to the current in the photosensor. A pulse width modulation integrated circuit (PWMIC) is included in the switch control circuit to regulate the current passing the primary winding of the transformer 204 according to the regulation control signal. In pulse width modulation, maximum duty cycle is typically used to charge up the output voltage VOUT, while minimum duty cycle is used during the decay phase of VOUT. In certain embodiment, the output voltage VOUT is larger than the reference voltage. The LED light is turned on and results an electrical pulse transmitted to the PWMIC. The PWMIC controls the transformer to store more energy and results in a smaller VOUT. This switched feedback loop effectively avoids regulating VOUT by dissipating excessive power by heat and largely enhances energy efficiency.

A low power mode or a sleep mode is incorporated in the SMPS core 202 to further improve energy efficiency. In the low power mode, circuit components in the SMPS core 202 are maintained at minimum current levels only to sustain proper functionality, while temporal response may be slow and VOUT may not be regulated at a stable target voltage. In particular, when the AC power source is first connected to the wall sockets, the SMPS core 202 normally starts up at the low power mode; upon receiving a signal indicating existence of a DC load, the SMPS core 202 switches to a normal power mode. In the normal power mode, the output voltage VOUT is tightly regulated by the aforementioned switched feedback loop. When a DC load is applied, the power control loop 220 provides a feedback signal indicating the load presence to the SMPS core 202 to initiate the normal power mode.

The power control loop 220 comprises a load detector 216, a low power mode control circuit 224 and an opto-coupler 226. The load detector 216 is coupled to the output of the SMPS core 202, and generates a Detect Flag signal to indicate connection of the DC load 160. The Detect Flag signal is used by the low power mode control circuit 224 and the opto-coupler 226 to generate a Power Control signal. The Power Control signal controls the SMPS core 202 to operate at the normal power mode. The opto-coupler 226 is applied to isolate the output voltage VOUT from incoming noises and lethal electrical shocks received by the input conditioning circuit 208. In certain embodiment, alternative isolation circuit may be used in lieu of the opto-coupler 226 and the opto-coupler 210 in the switched feedback loop.

In certain embodiments, the power control loop 220 includes a power supply identification (PSID) circuit 214. The PSID circuit 214 provides information about the power supply to the DC load through a dedicated data channel. Information about a power supply may be sent as a serial data signal including attributes such as power type (e.g., AC or DC), wattage/voltage/current rating, manufacturer, part number, and country of origin. The PSID circuit 214 also detects the existence of the DC load while sending the power supply information. A Load Presence/ID signal is generated and further processed by the low power mode control circuit 224 and opto-coupler 226. As a result, the Power Control signal is also enabled to indicate the presence of the DC load 160 and control the SMPS to the normal power mode.

Both the PSID circuit 214 and the load detector 216 may be employed to detect the DC load 160. However, the PSID circuit 214 may use a dedicated data pin, and once this data pin is damaged, the normal power mode may never be started and the DC load 160 may not be driven by a stable DC voltage. The load detector detects the variation of the output voltage VOUT directly to determine the presence of the DC load 160. This VOUT-based load detection method is more reliable, and will provide a proper startup from the low power mode to the normal power mode once a DC load is connected.

The load condition may be detected by measuring the decay rate of the output voltage VOUT. In the low power mode, current consumption is minimized, and therefore, VOUT is not fixed at a stable voltage. The regulation and power delivery circuit 206 may comprises a comparator to detect whether the output voltage VOUT drops to a low threshold voltage $V_{THL}$. Once VOUT drops below $V_{THL}$, the charging process is initiated to charge VOUT back to a high threshold voltage $V_{THH}$. This high threshold voltage $V_{THH}$ is normally equal to the target output voltage. Due to limited charging capability, VOUT starts to decrease gradually, and should reach the low threshold voltage $V_{THL}$ prior to being recharged to $V_{THH}$. The charging process is normally rapid and causes a sharp rising edge while the relatively slow discharge process leads to a much smaller decay rate. Moreover, compared to the decay rate at no load condition, the decay rate of VOUT is much faster when the AC-DC adapter 200 is loaded with the DC load 160. A threshold decay rate $DR_{TH}$ may be predetermined to differentiate two cases which are associated with a DC load or no load, respectively. If the decay rate is larger than the threshold decay rate $DR_{TH}$, then the DC load 160 is connected; otherwise, there is no load to the AC-DC adapter 200.

Figure 3:
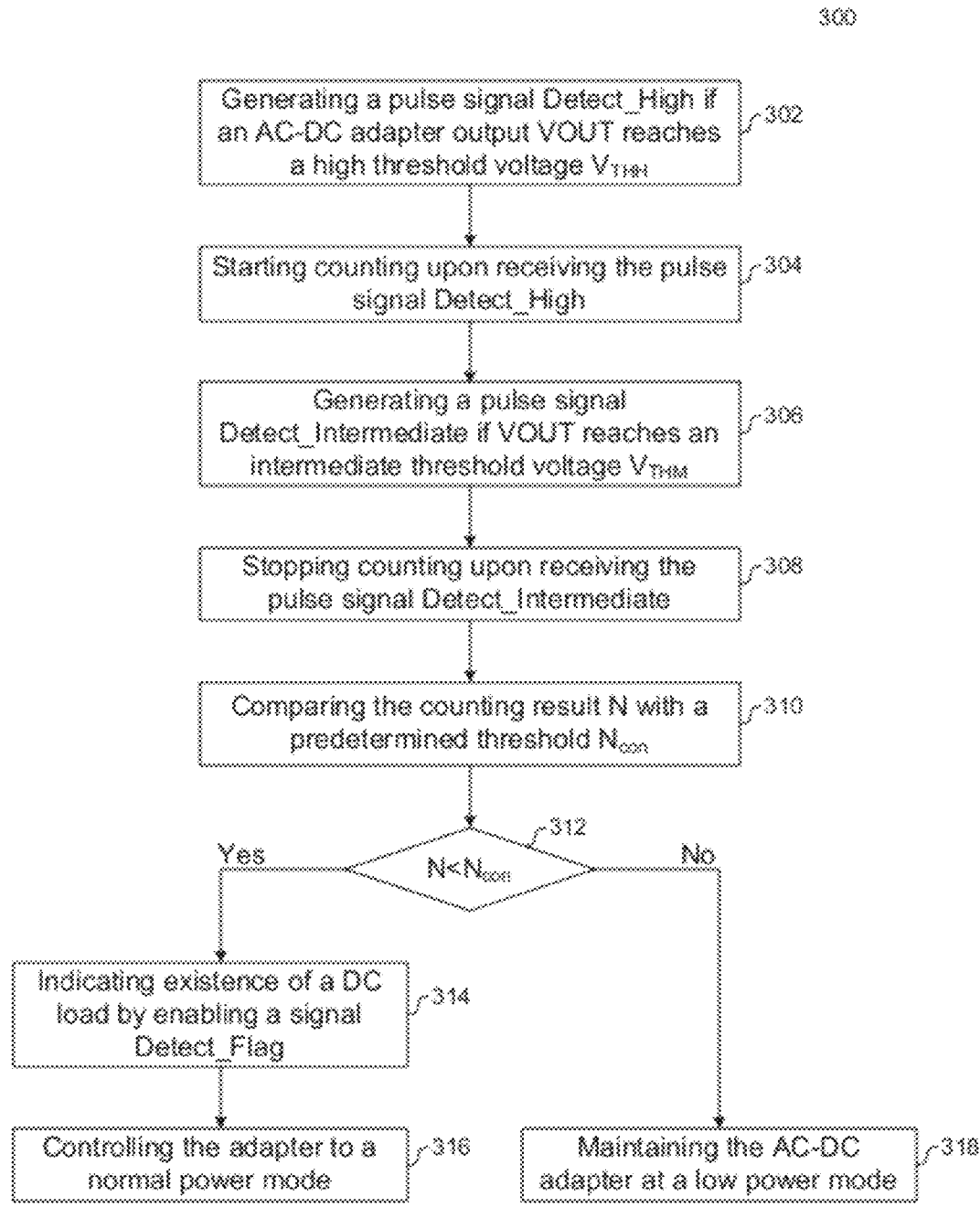
FIG. 3 illustrates an exemplary flow chart for a method of detecting the DC load coupled to the output of the AC-DC adapter at the low power mode according to various embodiments of the invention.

FIG. 3 illustrates an exemplary flow chart 300 for a method of detecting a DC load 160 being coupled to the output of the AC-DC adapter 200 at the low power mode. In step 302, a first pulse signal Detect_High is first generated when the output voltage VOUT reaches a high threshold voltage $V_{THH}$. The signal Detect_High is used to initiate a counting process in step 304 while the output voltage VOUT starts to drop. A second pulse signal Detect_Intermediate is generated when the output voltage VOUT reaches an intermediate threshold voltage $V_{THM}$ (step 306), and the signal Detect_Intermediate is used to stop the counting process in step 308. A counter threshold $N_{con}$ is derived from the threshold decay rate $DR_{TH}$, the high and intermediate threshold voltages $V_{THH}$ and $V_{THM}$, and clock frequency $f_{CLK}$. Thus, the counter threshold is represented as $$N_{con} = f_{CLK} \frac{V_{THH} - V_{THM}}{DR_{TH}}. \tag{1}$$

The counting result N is subsequently compared to the predetermined threshold $N_{con}$ in step 310. If N is larger than $N_{con}$, the decay rate of VOUT is small and the AC-DC adapter is maintained at the low power mode (step 318). If N is smaller than $N_{con}$, the decay rate of VOUT is large. A signal Detect_Flag indicating the presence of a DC load is generated in step 314, and the AC-DC adapter is controlled to turn on the normal power mode and generate a stable output voltage VOUT (step 316) that is tightly regulated at the target output voltage.

In certain embodiment, although the decay time decreases dramatically when a DC load is applied, it varies slightly between consecutive decay cycles when no DC load is applied. The variation of consecutive decay times may also indicate whether a DC load is applied. $N_{con}$ is constantly updated as a fraction of the clock cycle numbers related to a decay. Load condition of a subsequent decay is determined by comparing the related clock cycles with $N_{con}$ directly.

Figure 4:
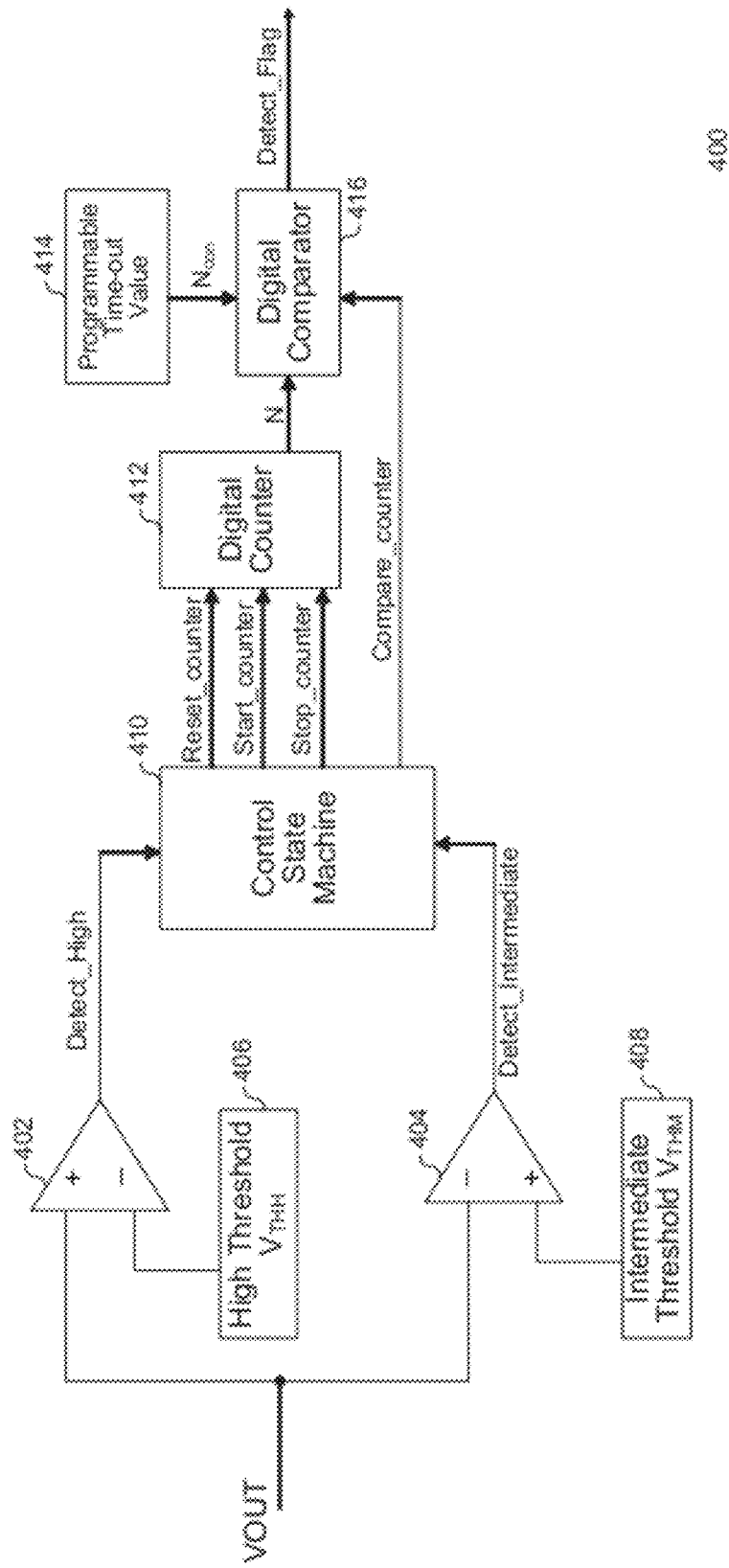
FIG. 4 illustrates an exemplary block diagram for a load detector according to various embodiments of the invention.

FIG. 4 illustrates an exemplary block diagram 400 for a load detector. The load detector 400 comprises two comparator 402 and 404, a high threshold voltage generator 406, an intermediate voltage generator 408, a control state machine 410, a digital counter 412, a programmable time-out value generator 414, and a digital comparator 416. The high and intermediate voltage generators 406 and 408 are used to generate the high and intermediate threshold voltages $V_{THH}$ and $V_{THM}$, respectively. The comparator 402 is coupled to receive and compare the output voltage \T$_{our}$ and the high threshold voltage V$_{THH}$, and the first pulse signal Detect_High is enabled once VOUT reaches V$_{THH}$. Similarly, the comparator 404 is coupled to receive and compare \T$_{our}$ and the intermediate threshold voltage V$_{THM}$, and the second pulse signal Detect_Intermediate is enabled once VOUT reaches V$_{THM}$.

Controlled by the signals Detect_High and Detect_Intermediate, the control state machine 410 generates sequential control signals Reset_counter, Start_counter, Stop_counter and Compare_counter. The signal Detect_High is used to sequentially reset and start the subsequent counter 412 within two consecutive clock cycles, and the signal Detect_Intermediate is used to stop the digital counter 412 and enable a comparison. The decay time from V$_{THH}$ to V$_{THM}$ is outputted by the digital counter 412 as the counting result N which represents an integer number of clock cycles. The counter threshold N$_{con}$ is provided by the programmable time-out value circuit 414, and it may be a fixed value or a fraction of the previous counting result. Enabled by the control signal Compare_Counter, the digital comparator 416 is coupled to receive and compare the counting result N and the counter threshold N$_{con}$. As a result, a third pulse signal Detect_Flag is generated to indicate the load condition.

Figure 5:
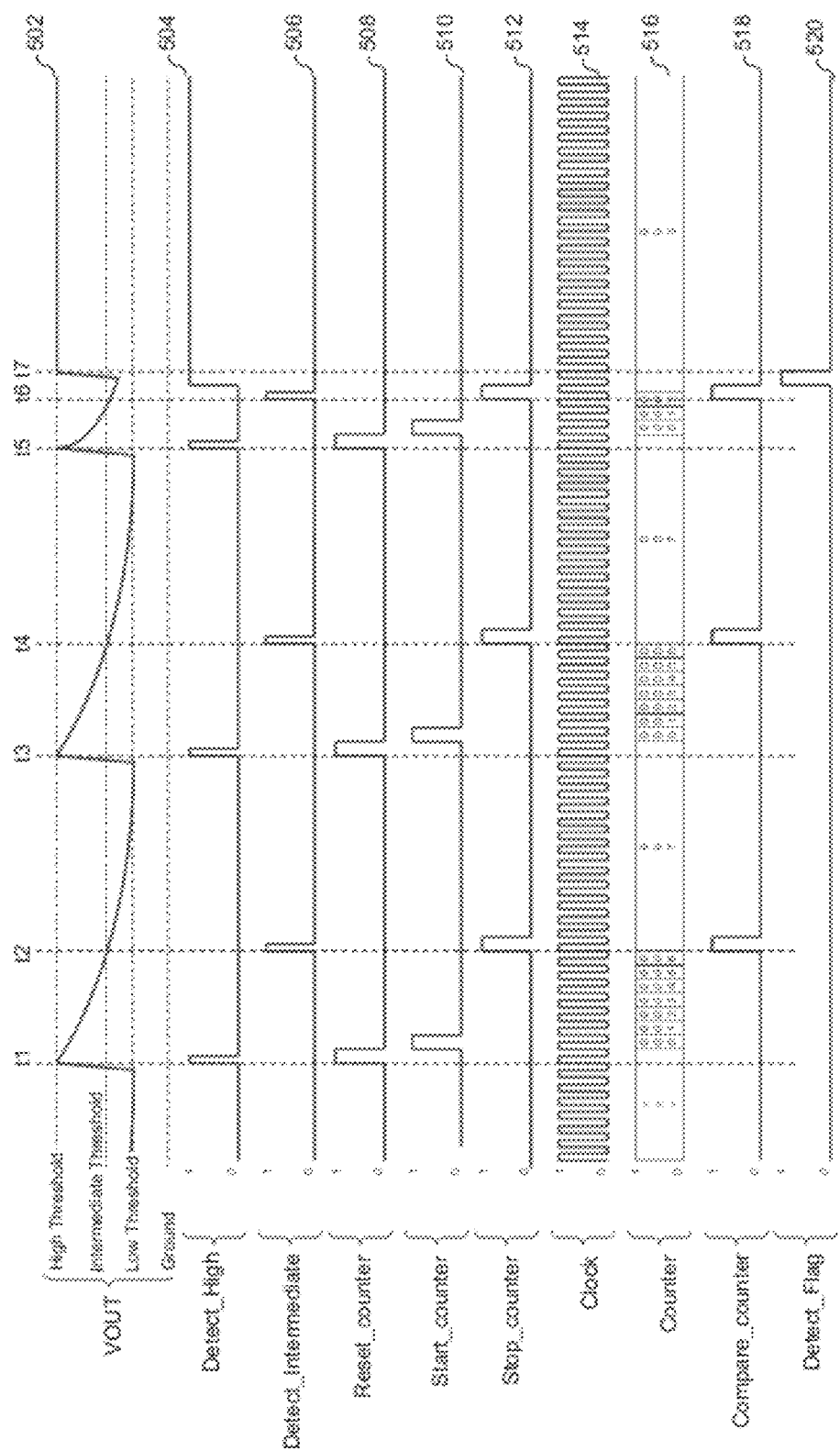
FIG. 5 illustrates an exemplary timing diagram of signals in the load detector according to various embodiments of the invention.

FIG. 5 illustrates an exemplary timing diagram 500 of signals in the load detector 400. The load detector 400 is coupled to receive the output voltage VOUT 502 and generates the pulse signal Detect_Flag 520. The signals Detect_High 504, Detect_Intermediate 506, Reset_counter 508, Start_counter 510, Stop_counter 512, and Compare_counter 518 are all internal signals in the load detector 400. A signal Counter 516 is a multiple bit signal representing the counting result N in binary. A clock signal 514 may be provided externally or generated internally, and regardless of the clock sources, the clock frequency has to meet a certain accuracy requirement.

In various embodiments of the invention, the AC-DC adapter starts at the low power mode, and switches to the normal power mode at time t7 after the DC load 160 is attached at a specific time t5. At times t1, t3, t5 and t7, VOUT reaches V$_{THH}$. Prior to the times t1, t3, and t5, VOUT drops towards the low threshold voltage V$_{THL}$. Once it reaches V$_{THL}$, VOUT is recharged up to V$_{THH}$ within a short period of time. After the DC load 160 is coupled, VOUT may not drop to the V$_{THL}$ prior to time t7 while it is still charged to V$_{THH}$ at time t7 at a fast rate. At times t2, t4 and t6, VOUT drops down to the intermediate threshold voltage V$_{THM}$.

In this low power mode, VOUT decays during time durations of t1-t3, t3-t5 and t5-t6 regardless of the load condition. In certain embodiments, the durations t1-t3 and t3-t5 may last 5-15 seconds when no DC load is applied to the AC-DC adapter. When the DC load 160 is connected, the length of duration for t5-t6 decreases, and the decay rate increases in comparison with the case when the DC load is absent. A smaller DC load is associated with a relatively longer decay time and a slower decay rate. In some embodiment, notebook computers are used as the DC load 160, and the target DC voltage is 19-20V. The intermediate and low threshold voltages V$_{THM}$ and V$_{THL}$ are preferably set at 17.5V and 7-8V, respectively.

At time t1, the output voltage VOUT is charged to the high threshold voltage V$_{THH}$, and the signal Detect_High is enabled for half a clock cycle. Detect_High may also be employed by the SMPS core 202 as a feedback control to avoid VOUT increasing beyond V$_{THH}$. As Detect_High is enabled, the signals Reset_counter 508 and Start_counter 510 are subsequently enabled within two consecutive clock cycles. Hence, the digital counter 412 is first reset and then restarted for counting while VOUT drops from V$_{THH}$. The decay time is tracked by the digital counter 412 as a number of clock cycles. At time t2, the output voltage VOUT drops to the intermediate threshold voltage V$_{THm}$, and the signal Detect_Intermediate is enabled for half a clock cycle. The signals Stop_counter 512 and Compare_counter 518 are subsequently enabled to stop counting and start to compare the counting result with the counter threshold N$_{con}$. The counting result (i.e., the signal Counter 516) stays at the output of the digital counter 412 until VOUT drops to the low threshold voltage V$_{THL}$, and the next VOUT charging and discharging cycle starts at time t3.

No DC load is applied during time periods t1-t3 and t3-t5, and therefore, the signal Detect_Flag is low. As soon as the DC load 160 is applied at time t5, the decay rate of VOUT is dramatically faster between times t5-t6. The counting result drops below the predetermined counter threshold N$_{con}$, and the signal Detect_Flag is enabled for a clock cycle to indicate the existence of the DC load 160. At the beginning of the subsequent clock cycle (time t7), the normal power mode may be applied to the AC-DC adapter and the output voltage VOUT is sustained at a stable target voltage equal to V$_{THH}$. Therefore, the AC-DC adapter switches from the low power mode to the normal power mode under the control of the load detector 216 while exempting the need for the PSID circuit 214 and a dedicated data channel.

One of those skilled in the art knows that the decay rate or time of VOUT may be measured between two random threshold voltages selected within decay durations of VOUT. The high threshold voltage V$_{THH}$ is not necessarily equal to the target output voltage, and if not, the signal Detect_High should not be used as a negative feedback to control the SMPS core 202. The intermediate threshold voltage V$_{THM}$ may be reduced, but should be larger than the minimum output voltage that VOUT drops to when a DC load exists. V$_{THH}$ and V$_{THM}$ should be selected reasonably apart within the range of the target output and the minimum output voltage to result in reliable measurement of the decay time.

Likewise, the above method of detecting a DC load is also applicable to a DC-DC adapter that may be controlled to a low power mode and a normal power mode. In the normal power mode, high power consumption is applied to sustain the DC output voltage VOUT, while in the low power mode, power consumption is reduced to maintain function. Regardless of the adapter configuration, the load condition directly impacts the charge/discharge rates of VOUT in the low power mode. In particular, the decay rate of the output voltage VOUT increases when the load is applied. A threshold is determined to differentiate the decay rates at presence and absence of the load. Once the decay rate of VOUT is measured beyond a threshold, the normal power mode is enabled to sustain the desirable level for the output voltage VOUT.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the present invention.

We claim:

1. An AC-DC adapter comprising: a switch-mode power supply coupled to receive an input AC voltage, the switch-mode power supply converting the input AC voltage to a DC output voltage that drives a load; a power control loop coupled to the switch-mode power supply, the power control loop receiving the DC output voltage and providing a power control signal to configure the switch mode power supply according to a decay rate of the DC output voltage, wherein the power control loop further comprises: a power mode control circuit that is coupled to the load detector and generates the power control signal, and a load detector that is coupled to the power mode control and counts a number of clock cycles in a time interval during which the DC output voltage decays from a high threshold voltage to an intermediate threshold voltage and compare the number of clock cycles with a predetermined threshold number of clock cycles to determine presence and absence of the load.

2. The AC-DC adapter in claim 1, wherein the power control loop further comprises a power supply identification circuit that is coupled to the load, the power supply identification circuit detecting presence of the load and communicating a load presence and identification signal between the AC-DC adapter and the load, the load presence and identification signal being a digital data that is distinct from the DC output voltage.

3. The AC-DC adapter in claim 1, wherein the switch-mode power supply further comprises: an input conditioning circuit that converts the input AC signal to a first high-frequency AC signal;
 a transformer coupled to the input conditioning circuit, the transformer converting the first high-frequency AC signal to a second high-frequency AC signal;
 a regulation and power delivery circuit coupled between the transformer and the load, the regulation and power delivery circuit rectifying and filtering the second high-frequency AC signal to generate the DC output voltage;
 an opto-coupler coupled between the input conditioning circuit and the regulation and power delivery circuit, the opto-coupler forming a switched feedback loop to regulate the DC output voltage by controlling pulse width modulation in the input condition circuit; and
 wherein the power control signal is provided by the power control loop to control pulse width modulation in the input conditioning circuit.

4. The AC-DC adapter in claim 1, wherein the switch-mode power supply is configured to a sleep mode when presence of the load is not detected, and power consumption is reduced from driving the load.

5. The AC-DC adapter in claim 1, wherein the power control loop further comprises an opto-coupler used as an interface to couple the power control loop to the switch-mode power supply voltage.

6. The AC-DC adapter in claim 1, wherein the AC-DC adapter is coupled to the load via a cable that transmits a positive terminal signal, a negative terminal signal and a center data signal, and the DC output voltage is associated with the positive terminal signal.

7. The AC-DC adapter in claim 1, wherein the AC-DC adapter is coupled to the load via a cable that transmits a positive terminal signal that is associated with the DC output voltage.

8. A method of converting an input AC voltage to a DC output voltage in an AC-DC adapter, comprising steps of: receiving the DC output voltage that is generated by a switch-mode power supply in the AC-DC adapter from the input AC voltage; starting to count a number of clock cycles when a voltage level of the DC output voltage reaches a high threshold voltage; stopping counting the number of clock cycles when the voltage level of the DC output voltage drops from the high threshold voltage to an intermediate threshold voltage; comparing the number of clock cycles with a predetermined threshold number of clock cycles; determining presence and absence of a load according to the comparison result; and configuring the switch-mode power supply in the AC-DC adapter according to presence of the load.

9. The method in claim 8, wherein a power supply identification circuit is used to detect presence of the load and provide a load presence and identification signal, the load presence and identification signal being a digital data that is distinct from the DC output voltage.

10. The method in claim 8, wherein the switch-mode power supply is configured to a sleep mode when presence of the load is not detected, and power consumption is reduced from driving the load.

11. The method in claim 8, wherein a cable is used to couple the load, the cable transmitting a positive terminal signal, a negative terminal signal and a center data signal, the DC output voltage being associated with the positive terminal signal.

12. The method in claim 7, wherein a cable is used to couple the load and transmit a positive terminal signal that is associated with the DC output voltage.

13. The method in claim 7, wherein the switch-mode power supply is configured to a sleep mode when presence of the load is not present, and power consumption is reduced from driving the load.

14. (A method of converting an input AC voltage to a DC output voltage in an AC-DC adapter, comprising steps of: receiving the DC output voltage that is generated by a switch-mode power supply from the input AC voltage; starting to count a number of clock cycles when a voltage level of the DC output voltage reaches a high threshold voltage; stopping counting the number of clock cycles when the voltage level of the DC output voltage decays from the high threshold voltage to an intermediate threshold voltage; comparing the number of clock cycles with a predetermined threshold number of clock cycles; determining presence and absence of a load according to the comparison result; and configuring a switch-mode power supply to a power mode selected from a normal power mode and a sleep mode in the AC-DC adapter according to presence of the load, wherein the normal mode is enabled when the load is present and the sleep mode is enabled when the load is absent.

15. The method in claim 14, wherein a power supply identification circuit is used to detect presence of the load and provide a load presence and identification signal, the load presence and identification signal being a digital data that is distinct from the DC output voltage.

16. The method in claim 14, wherein the sleep mode is enabled when presence of the load is not detected, and power consumption is reduced from driving the load.

17. The method in claim 14, wherein a cable is used to couple the load and transmit a positive terminal signal that is associated with the DC output voltage.

* * * * *